United States Patent
He et al.

(10) Patent No.: US 11,809,376 B2
(45) Date of Patent: Nov. 7, 2023

(54) BUILDING A FILE SYSTEM FOR MULTIPLE ARCHITECTURES

(71) Applicant: International Business Machines Corporation, Armonk, NY (US)

(72) Inventors: Jin Chi JC He, Xi'an (CN); Guang Han Sui, Beijing (CN); Ke Zhang, Xi'an (CN); Yang Gao, Xi'an (CN); Yu Xing YX Ren, Xi'an (CN); Liang Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 17/319,133

(22) Filed: May 13, 2021

(65) Prior Publication Data

US 2022/0365907 A1    Nov. 17, 2022

(51) Int. Cl.
*G06F 16/17* (2019.01)
*G06F 16/11* (2019.01)
*G06F 16/13* (2019.01)

(52) U.S. Cl.
CPC .......... *G06F 16/173* (2019.01); *G06F 16/122* (2019.01); *G06F 16/128* (2019.01); *G06F 16/137* (2019.01)

(58) Field of Classification Search
CPC .... G06F 16/173; G06F 16/122; G06F 16/137; G06F 16/128; G06F 16/185; G06F 16/31
See application file for complete search history.

(56) References Cited

U.S. PATENT DOCUMENTS

| | | |
|---|---|---|
| 6,601,034 B1 | 7/2003 | Honarvar |
| 8,601,449 B2 | 12/2013 | Clevenger |
| 10,387,750 B2 | 8/2019 | Waugh |
| 11,093,221 B1 * | 8/2021 | Novy .................. G06F 8/63 |
| 2003/0046409 A1 * | 3/2003 | Graham ............ H04L 43/00 709/224 |

(Continued)

FOREIGN PATENT DOCUMENTS

CN        112231050 A        1/2021

OTHER PUBLICATIONS

Butler, J., "Introducing Multi-architecture Container Images for Amazon ECR", Amazon EC2 Container Registry, Containers, May 1, 2020, 9 pps., <https://aws.amazon.com/blogs/containers/introducing-multi-architecture-container-images-for-amazon-ecr/>.

Fenster, T., "Creating a Multi-arch Docker Image with Azure DevOps", Axians Infoma, Sep. 12, 2018, 5 pps., <https://www.axians-infoma.de/techblog/creating-a-multi-arch-docker-image-with-azure-devops/>.

(Continued)

*Primary Examiner* — Vaishali Shah
(74) *Attorney, Agent, or Firm* — David K. Mattheis

(57) ABSTRACT

In an approach to building a file system for multiple architectures, responsive to receiving a manifest for a file system build, a base layer is retrieved for each platform to be built, where the base layer is an operating system base. Responsive to determining that any layer to be built has not been built, the next layer to be built is retrieved. Responsive to the next layer to be built is platform-independent, the next layer is retrieved from a cache, where the next layer supports each platform. Responsive to the next layer to be built is platform-dependent, the next layer is built, where a copy of the next layer is built for each platform. The above steps are iteratively repeated until each layer is built. A single image of a completed file system build is stored, where the single image supports each platform.

20 Claims, 7 Drawing Sheets

(56) References Cited

U.S. PATENT DOCUMENTS

| | | | | |
|---|---|---|---|---|
| 2006/0069926 A1* | 3/2006 | Ginter | .................... | G06F 21/10 |
| | | | | 375/E7.009 |
| 2011/0082965 A1* | 4/2011 | Koka | ...................... | G06F 13/28 |
| | | | | 710/22 |
| 2012/0123999 A1* | 5/2012 | Ashutosh | .............. | G06F 16/128 |
| | | | | 707/618 |
| 2014/0082352 A1* | 3/2014 | Howry | .................. | H04W 12/30 |
| | | | | 713/157 |
| 2014/0152383 A1* | 6/2014 | Nikonov | ................. | B32B 27/06 |
| | | | | 700/98 |
| 2017/0161039 A1 | 6/2017 | Banerjee | | |
| 2017/0264684 A1* | 9/2017 | Spillane | .............. | H04L 67/1095 |
| 2017/0374151 A1* | 12/2017 | Moorthi | .............. | H04L 67/1097 |
| 2018/0095973 A1* | 4/2018 | Huang | ................ | G06F 16/1748 |
| 2018/0113705 A1* | 4/2018 | Webb | ........................ | G06F 8/76 |

OTHER PUBLICATIONS

Krohmer, A., "Proposal: Deduplicated Storage and Transfer of Container Images", downloaded from the internet on Feb. 10, 2021, 5 pps.,<https://gist.github.com/devkid/5249ea4c88aab4c7bff1b34c955c1980>.

Norman, C., "Create and Use Multi-architecture Docker Images", IBM Developer, Jul. 27, 2017, 6 pps., <https://developer.IBM.com/tutorials/createmulti-architecture-docker-images/>.

Parco, A., "Building Multi-Arch Images for Arm and x86 with Docker Desktop", Apr. 24, 2019, 4 pps., <https://www.docker.com/blog/multi-arch-images/>.

Skourtis, D., et al., "Carving Perfect Layers out of Docker Images", 2019, 8 pps., <https://www.usenix.org/conference/hotcloud19/presentation/skourtis>.

\* cited by examiner

```
"layers": [
        { "mediaType": "application/vnd.container.image.rootfs.diff.tar.gzip",
          "size": 972,
          "digest":
"sha256:b04784fba78d739b526e27edc02a5a8cd07b1052e9283f5fc155828f4b614c28"
        }
]
```

FIG. 5a

```
"layers": [
        { "mediaType": "application/vnd. container.image.rootfs.diff.tar.gzip",
          "size": 972,
          "digest":
"sha256:b04784fba78d739b526e27edc02a5a8cd07b1052e9283f5fc155828f4b614c28"
          "Platform": {
                  "architecture": "amd64, ppc64le (or all )",
                  "os": "linux"
          }
        }
]
```

FIG. 5b

BUILDING A FILE SYSTEM FOR MULTIPLE ARCHITECTURES

BACKGROUND

The present invention relates generally to the field of software development, and more particularly to building a file system for multiple architectures.

In computing, a file system controls how data is stored and retrieved. Without a file system, data placed in a storage medium would be one large body of data with no way to tell where one piece of data stops and the next begins. By separating the data into pieces and giving each piece a name, the data is easily isolated and identified. There are many different kinds of file systems. Each one has different structure and logic, properties of speed, flexibility, security, size and more. Some file systems have been designed to be used for specific applications.

A container is a standard unit of software that packages up code and all its dependencies, so the application runs quickly and reliably from one computing environment to another. A container image is a lightweight, standalone, executable package of software that includes everything needed to run an application: code, runtime, system tools, system libraries and settings. A container consists of an entire runtime environment: an application, plus all of its dependencies, libraries, and other binaries, and configuration files it needs to run, bundled into one package.

An instruction set architecture (ISA) is an abstract model of a computer, also referred to as computer architecture. A realization of an ISA is called an implementation. An ISA permits multiple implementations that may vary in performance, physical size, and monetary cost (among other things), because the ISA serves as the interface between software and hardware. Software that has been written for an ISA can run on different implementations of the same ISA.

SUMMARY

Embodiments of the present invention disclose a method, a computer program product, and a system for building a file system for multiple architectures. In one embodiment, responsive to receiving a manifest for a file system build, a base layer is retrieved for each platform to be built, where the base layer is an operating system base. Responsive to determining that any layer to be built has not been built, the next layer to be built is retrieved. Responsive to the next layer to be built is platform-independent, the next layer is retrieved from a cache, where the next layer supports each platform of the one or more platforms. Responsive to the next layer to be built is platform-dependent, the next layer is built, where a copy of the next layer is built for each platform of the one or more platforms. The above steps are iteratively repeated until each layer is built. A single image of a completed file system build is stored, where the single image supports each platform of the one or more platforms.

BRIEF DESCRIPTION OF THE DRAWINGS

FIG. 5a is an example of part of a manifest file for a container system without the present invention, in accordance with an embodiment of the present invention.

FIG. 5b is an example of part of a manifest file for a container system using the present invention, in accordance with an embodiment of the present invention.

DETAILED DESCRIPTION

Figure 1:
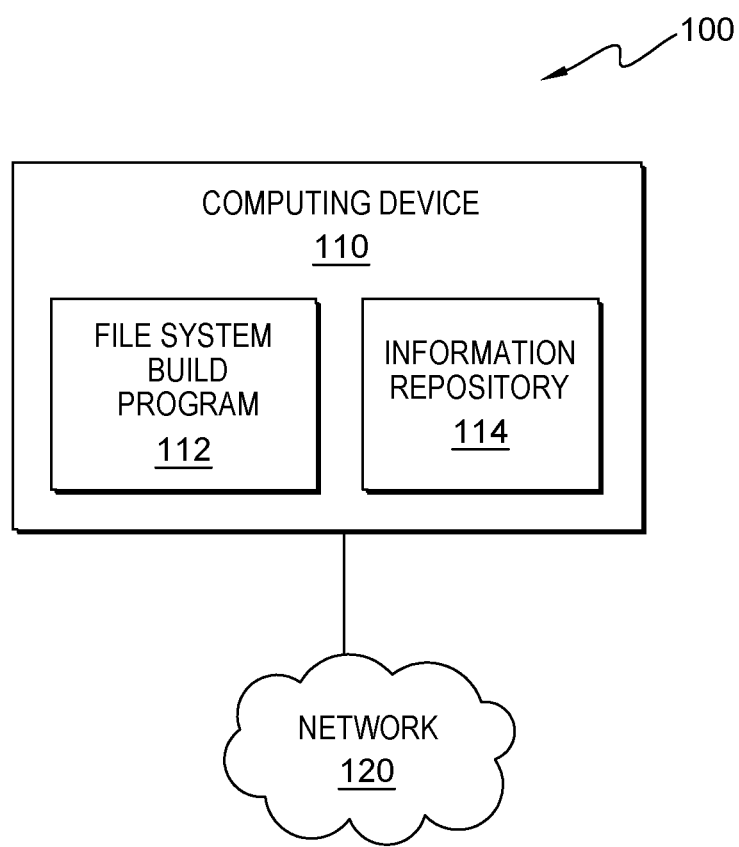
FIG. 1 is a functional block diagram illustrating a distributed data processing environment, in accordance with an embodiment of the present invention.

Multiple layer file systems are in widespread use due to the popularity of container images, e.g., AUFS, overlay2, and deviceMapper, among others. Currently when users build multi-layer file systems, they need to build different file systems for different CPU architecture platforms, such as x86_64, ppc64le, s390x, etc. The image for each platform needs to be completed on its own platform, for example, the user must build a pp164ce image on a POWER architecture system, which requires the appropriate hardware resources. Sometimes a user does not have access to the platform, and development time is wasted while sourcing the necessary build hardware. Once the image is built, the user needs to upload the images (including the multiple layers) separately and store the images separately in a registry for each platform.

Currently, some layers are platform-independent and can be shared for all platforms. Other layers, by first adding/installing platform-dependent binaries to some platform-dependent layers, can be cross-built and then added to the image. The images for different platforms are separated and stored separately in a layer database, e.g., LayerDB, and a layer storage, e.g., GraphDriver, even for platform-independent layers, which wastes storage due to the duplication of entries for the same build.

The present invention solves the following problems: 1) users need to build file systems/images for different platforms, which wastes time and duplicates effort for different platforms; 2) the platform-independent layers are stored separately for each platform, which wastes storage space, and are hard to maintain, i.e., if one image layer changes, a user needs to rebuild the image for all platforms; and 3) users need to build images for different platforms from the beginning and cannot use cached or shared layers from other platforms, which wastes time during building.

The present invention is a computer-implemented method, computer program product, and system to allow an image repository to save only one copy of platform-independent layers. The present invention saves storage space, is easy to maintain, and if one platform-independent layer is updated there is no need to build the layer for all platform images.

The present invention allows the user to bypass the layer build if the layer is platform-independent or if a cached image already exists. The present invention may allow the user to bypass the entire image build operation for other platforms, and also helps to save user time. The present invention may cross-build file systems for other platforms, e.g., s390x, on an existing platform, e.g., x86_64, when the native hardware for the other platforms is not readily available.

In an embodiment, to cross build a file system for another platform on an existing platform, the present invention retrieves the manifest for the file system build. Next, the base layer (base OS) is retrieved for each platform to be built. In an embodiment, the user defines the base layer in the manifest. In an embodiment, if the user has not defined the base layer in the manifest, the system will search for the base layer. In an embodiment, the system builds the next layer. In an embodiment, if the layer to be built is platform-independent, then the layer is retrieved from a cache if available, but if not available in a cache or locally, then the system will build the layer and update the manifest. In an embodiment, if the layer is platform-dependent, the system will use cross-build tools, e.g., basic on QEMU, to build the layer. Finally, in an embodiment, the present invention will update the related layer database to add the layer to the related architecture and will push the layer to the registry if necessary, i.e., if the layer is not already in the registry.

FIG. 1 is a functional block diagram illustrating a distributed data processing environment, generally designated 100, suitable for operation of file system build program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes file system build program 112. In an embodiment, file system build program 112 is a program, application, or subprogram of a larger program for building a file system for multiple architectures. In an alternative embodiment, file system build program 112 may be located on any other device accessible by computing device 110 via network 120.

In an embodiment, computing device 110 includes information repository 114. In an embodiment, information repository 114 may be managed by file system build program 112. In an alternate embodiment, information repository 114 may be managed by the operating system of the device, alone, or together with, file system build program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, file system data, container data, image data, CPU architecture data, network layer data, platform data, cache data, registry data, manifest data, and other data that is received by file system build program 112 from one or more sources, and data that is created by file system build program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, a NoSQL database, an object-oriented database, or one or more tables.

Figure 2:
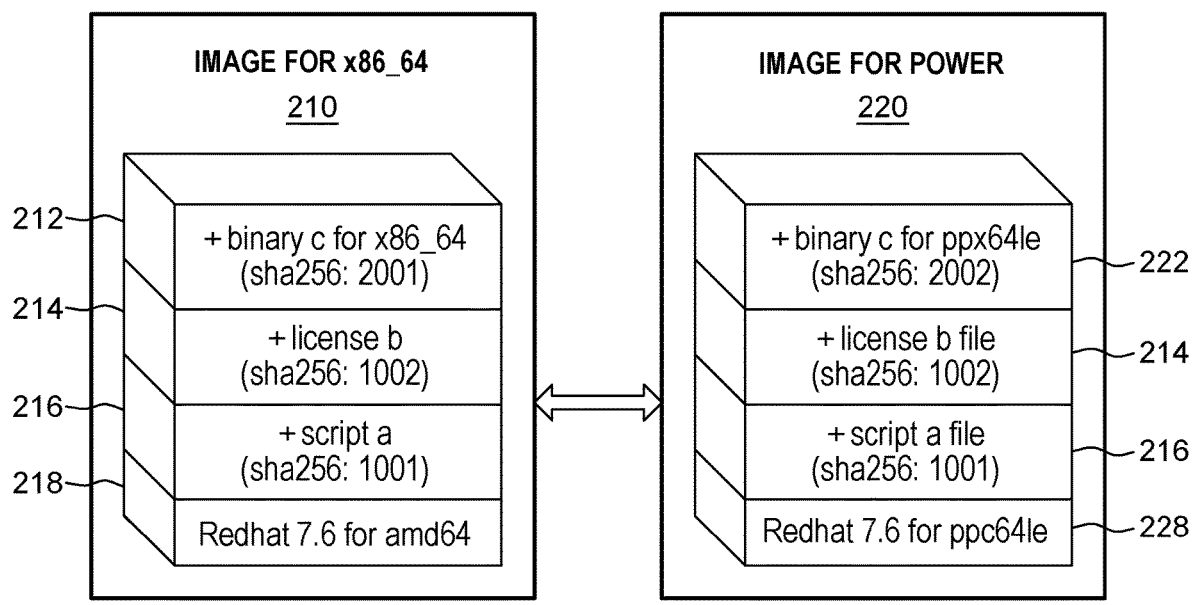
FIG. 2 is an example of an image built for a multiple layer file system without the present invention, in accordance with an embodiment of the present invention.

FIG. 2 is an example of an image built for a multiple layer file system without the present invention, in accordance with an embodiment of the present invention. This example contains two images for the same container, Image for x86_64 210 and Image for Power 220. Each of the images in this example consist of four file system layers.

For Image for x86_64 210, these layers consist of binary image 212 on layer c, license file 214 on layer b, script file 216 on layer a, and operating system (OS) base image 218. For Image for Power 220, these layers consist of binary image 222 on layer c, and OS base image 228, both of which are specific to the Power architecture. But Image for Power 220 also includes license file 214 on layer b and script file 216 on layer a, both of which are platform-independent. Currently therefore, storage has to be allocated for two copies of both license file 214 on layer b and script file 216 on layer a, even though these are identical images for both architectures.

The example of FIG. 2 is a simple case to illustrate the current problem. In actual applications, the containers may be much larger, with many more layers, and many more architectures may be supported. This leads to much more duplication in storage of platform-independent layers for these containers.

Figure 3:
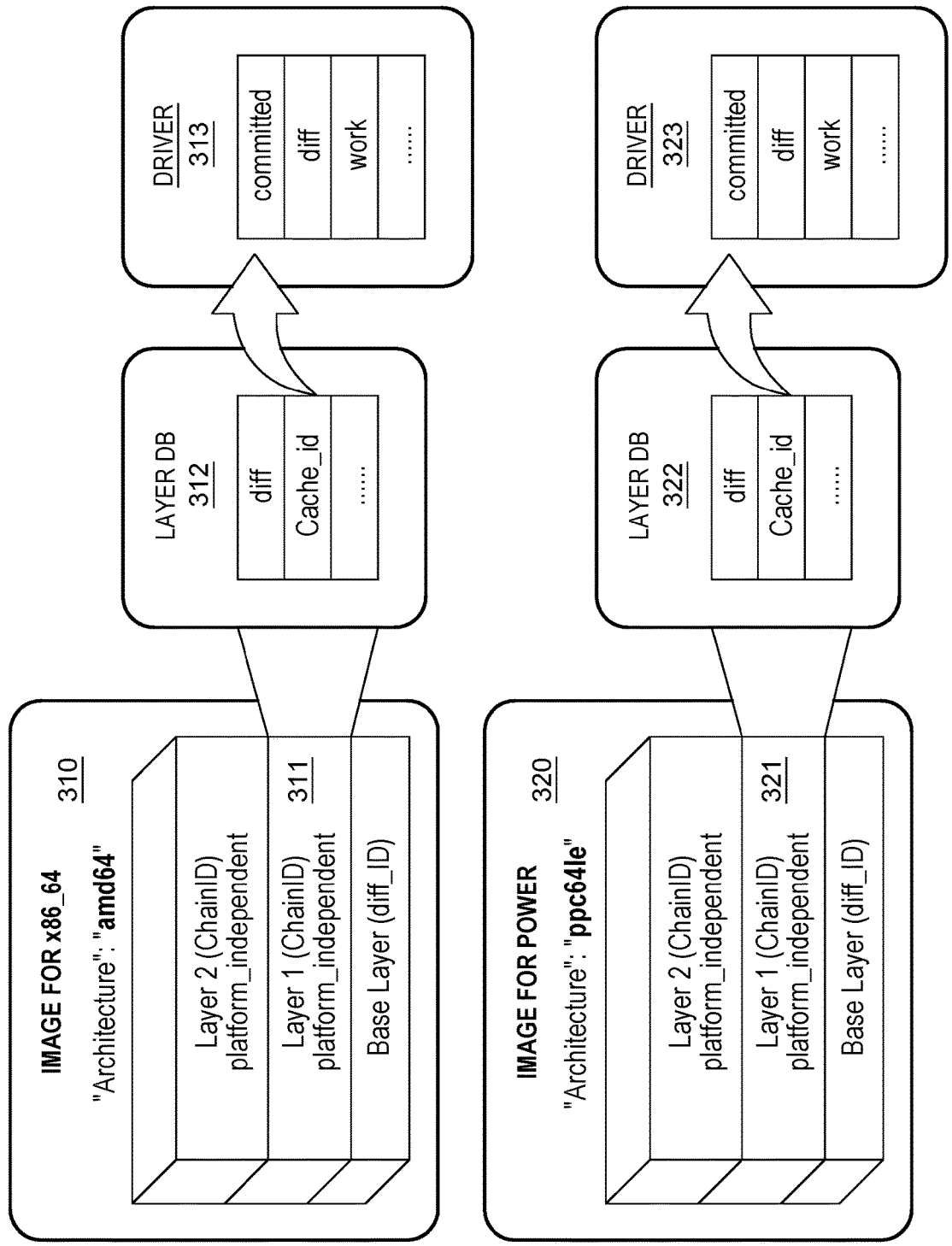
FIG. 3 is another example of an image built for a multiple layer file system without the present invention, in accordance with an embodiment of the present invention.

FIG. 3 is another example of an image built for a multiple layer file system without the present invention, in accordance with an embodiment of the present invention. This example, like the example of FIG. 2, contains two images for the same container, Image for x86_64 310 and Image for Power 320.

In this example, Layer1 311 of Image for x86_64 310 and Layer1 321 of Image for Power 320 represent the same platform-independent layer. Currently, however, each image will have a separate copy of Layer1, even though they are identical. This example shows that an entry is created in Layer Database (DB) 312 for Layer1 311, which points to the storage of Layer1 311 in Driver 313. Likewise, an entry is created in Layer DB 322 for Layer1 321, which points to the storage of Layer1 321 in Driver 323. Even though Layer1 311 is identical to Layer1 321, two identical copies of the same layer in two separate repositories and create two separate entries in two separate databases for the same layer file without the present invention.

Figure 4:
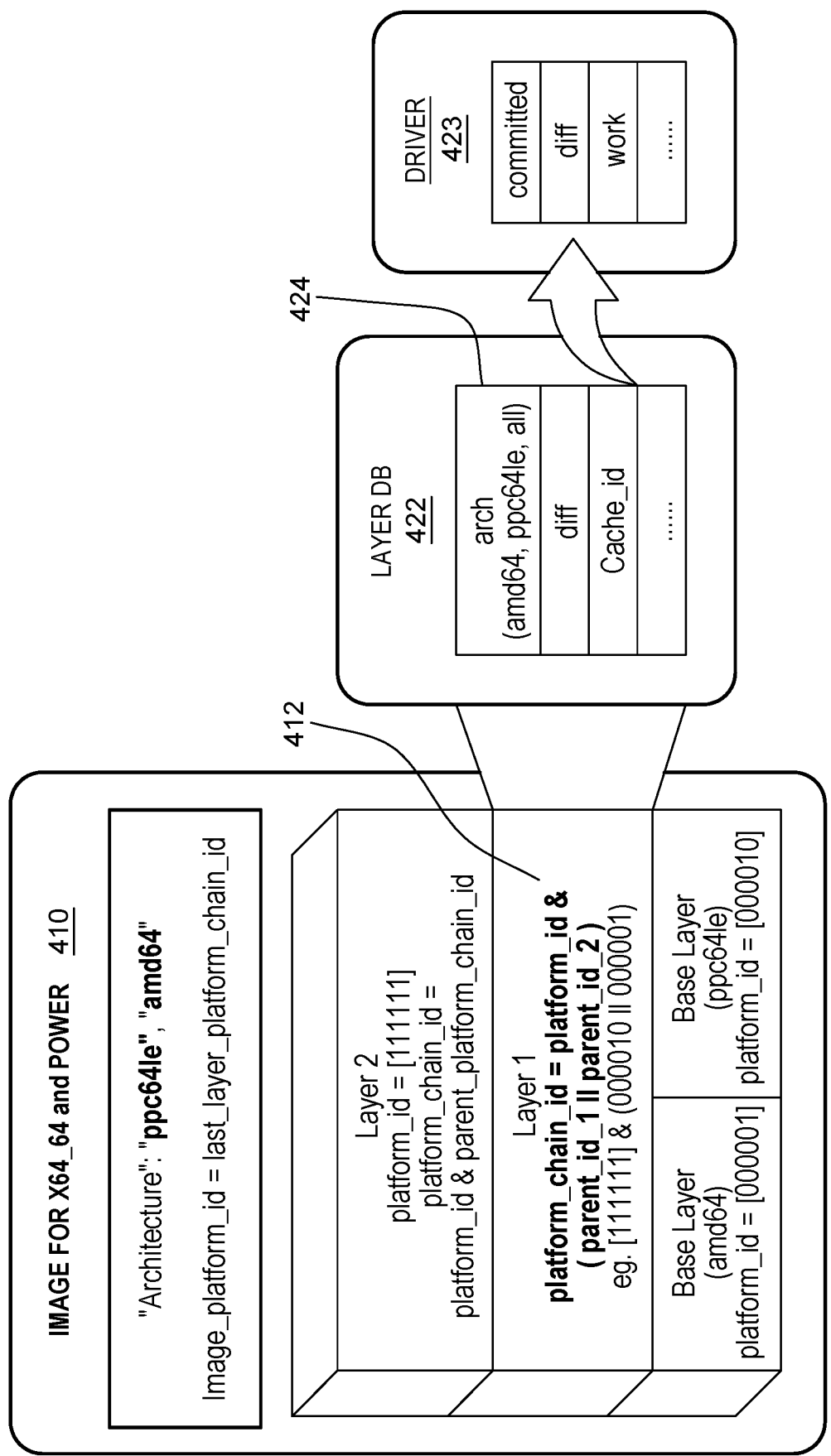
FIG. 4 is an example of an image built for a multiple layer file system using the present invention, in accordance with an embodiment of the present invention.

FIG. 4 is an example of an image built for multiple layer file systems using the present invention, in accordance with an embodiment of the present invention. This example contains one image for a container, Image for x86_64 and Power 410, which supports both the ppc64le and amd64 (for x86 architecture) file systems using one image.

In this example, Layer1 412 is platform-independent, so instead of storing multiple copies as in the examples in FIG. 2 and FIG. 3 above, the present invention only stores a single copy in Driver 423. A new field, arch 424, is added to the layer identification that identifies the architectures that are supported by this layer, i.e., amd64 and ppc64le in this example. That field is stored in Layer DB 422, which then identifies the architectures supported by that layer for any container that may require that layer.

In an embodiment, the procedure to mark, or record, the platform-independent layers and images for the example of FIG. 4 is as follows. First, add one sequence field, e.g., platform_id, is added to the record for the image in an image database, e.g., imageDB, where each bit represents one platform. For example, "111111" may mean that the image supports all platforms, while "000001" may mean the image only supports one specific platform, e.g., amd64. In the example of FIG. 4, since Layer1 412 is platform-independent, the platform_id is "111111".

Next, another field, e.g., platform_chain_id, is added to the record in the image database to indicate the layer chain, which associates the layer with its parent layers for the platform. If the parent layers are platform-dependent, then the platform_chain_id=platform_id & (parent_platform_id1∥parent_platform_id2∥parent_platform_idn, where "&" represent the logical "AND" function and "∥" represents the logical "OR" function). If the parent layers are platform-independent, then the platform_chain_id=platform_id & (parent_platform_id). In the example of FIG. 4, since Layer1 412 is platform-independent, the platform_chain_id is (000010∥000001), where "000010" is the platform_id and "000001" is the parent_platform_id. The image architecture, e.g., amd64, is the last layer platform_chain_id. Finally, one field, e.g., "arch", is added in the layer database, which can be seen in Layer DB 422.

FIG. 5a is an example of part of a manifest file for a container system without the present invention, in accordance with an embodiment of the present invention.

FIG. 5b is an example of the part of a manifest file for a container system as in FIG. 5a above but modified by the present invention. In the example of FIG. 5b, a field has been added to the manifest file, Platform, to indicate which platforms are supported by the layer. In this example the architectures amd64 and ppc64le are supported for the operating system Linux.

Figure 6:
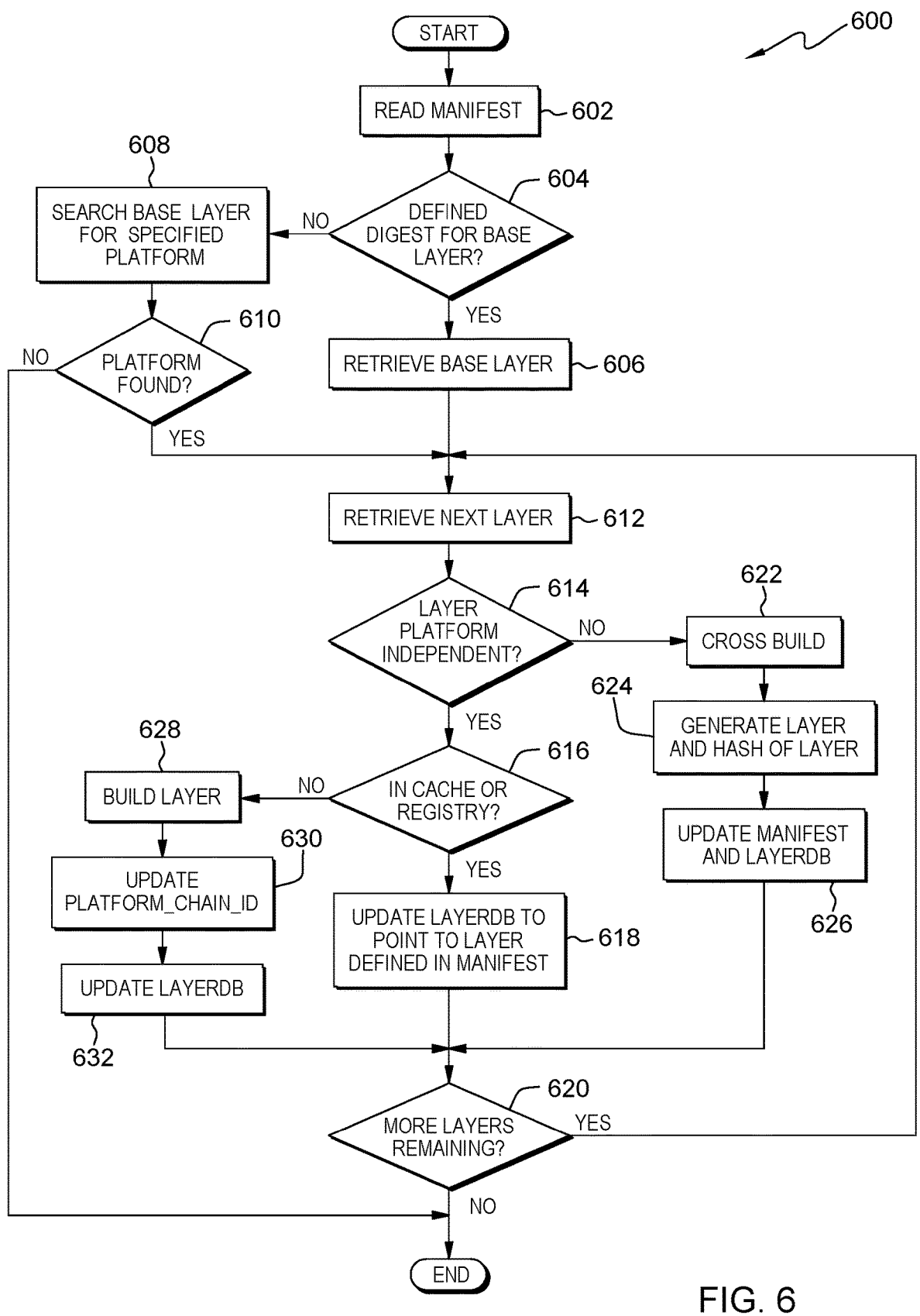
FIG. 6 is a flowchart depicting operational steps of the file system build program, on a computing device within the distributed data processing environment of FIG. 1, for building a file system for multiple architectures, in accordance with an embodiment of the present invention.

FIG. 6 is a flowchart depicting operational steps of file system build program 112, on a computing device within the distributed data processing environment of FIG. 1, for building a file system for multiple architectures, in accordance with an embodiment of the present invention. In an alternative embodiment, the steps of workflow 600 may be performed by any other program while working with file system build program 112.

In an embodiment, file system build program 112 retrieves the manifest for the file system to be built. In an embodiment, file system build program 112 determines if the base layer, i.e., the base OS, is defined in the manifest for the file system build. In an embodiment, if file system build program 112 determines that the base layer is defined in the manifest for the file system, then file system build program 112 uses the hash value in the manifest, e.g., the sha256 hash, to retrieve the base layer. In an embodiment, if file system build program 112 determines that the base layer is not defined in the manifest for the file system, then file system build program 112 searches for the base layer for the specified platform. In an embodiment, file system build program 112 determines whether the search was successful in finding the base layer. In an embodiment, file system build program 112 retrieves the next layer in the file system build from the manifest. In an embodiment, file system build program 112 determines whether the layer retrieved previously is platform-independent.

In an embodiment, file system build program 112 determines whether the layer is already in the layer cache or registry. In an embodiment, if file system build program 112 determines that the layer is already in the layer cache or registry, then file system build program 112 updates the entry for this layer in the layer database (LayerDB) to point to the layer that was defined in the manifest for this file system build. In an embodiment, file system build program 112 determines if there are more layers remaining in the file system build. In an embodiment, if file system build program 112 determines that the layer retrieved previously is not platform-independent, then file system build program 112 cross builds the layer on the current platform for the target platform for the file system build.

In an embodiment, file system build program 112 generates the layer and generates a hash of the layer, e.g., a sha256 hash. In an embodiment, file system build program 112 updates the layer database with the hash of the layer generated previously. In an embodiment, the hash value is a pointer to the layer in the layer database. In an embodiment, if file system build program 112 determines that the layer is not already in the layer cache or registry, then file system build program 112 builds the layer. In an embodiment, file system build program 112 updates the platform_chain_id of the build to include the new layer built. In an embodiment, file system build program 112 updates the layer database with the platform_chain_id of the layer generated previously.

It should be appreciated that embodiments of the present invention provide at least for building a file system for multiple architectures. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 6 illustrates one possible iteration of the operational steps performed by file system build program 112 for building a file system, which repeats each time a new image is to be deployed.

File system build program 112 reads a manifest (step 602). In an embodiment, file system build program 112 receives the manifest for the file system to be built.

File system build program 112 determines if there is a defined digest for the base layer (decision block 604). In an embodiment, file system build program 112 determines if the base layer, i.e., the base OS, is defined in the manifest for the file system build. In an embodiment, file system build program 112 determines that the base layer is defined in the manifest for the file system build if a hash value, e.g., a sha256 hash, exists for the base layer in the manifest. In an embodiment, if file system build program 112 determines that the base layer is defined in the manifest for the file system build ("yes" branch, decision block 604), then file system build program 112 proceeds to step 606 to retrieve the base layer. In an embodiment, if file system build program 112 determines that the base layer is not defined in the manifest for the file system build ("no" branch, decision block 604), then file system build program 112 proceeds to step 608 to search for the base layer.

File system build program 112 retrieves the base layer (step 606). In an embodiment, if file system build program 112 determines that the base layer is defined in the manifest for the file system in decision block 614, then file system build program 112 uses the hash value in the manifest, e.g., the sha256 hash, to retrieve the base layer. File system build program 112 then proceeds to step 612 to retrieve the next layer.

File system build program 112 searches the base layer for the specified platform (step 608). In an embodiment, if file system build program 112 determines that the base layer is not defined in the manifest for the file system, then file system build program 112 searches for the base layer for the specified platform. In an embodiment, file system build program 112 searches in remote registries for the specified file system, e.g., a docker registry.

File system build program 112 determines if the platform was found (decision block 610). In an embodiment, file system build program 112 determines whether the search conducted in step 608 was successful in finding the base layer. In an embodiment, if file system build program 112 was successful in finding the base layer ("yes" branch, decision block 610), then file system build program 112 proceeds to step 612 to retrieve the next layer. In an embodiment, if file system build program 112 was not successful in finding the base layer ("no" branch, decision block 610), then file system build program 112 cannot build the file system for this platform, so file system build program 112 ends for this cycle.

File system build program 112 retrieves the next layer (step 612). In an embodiment, file system build program 112 retrieves the next layer in the file system build from the manifest.

File system build program 112 determines if the layer is platform-independent (decision block 614). In an embodiment, file system build program 112 determines whether the layer retrieved in step 612 is platform-independent. In an embodiment, file system build program 112 determines that the layer retrieved is platform-independent by checking the "Platform" field in the manifest, as shown in the example of FIG. 5 above. In another embodiment, file system build program 112 determines that the layer retrieved is platform-independent by checking the layer database, e.g., Layer DB 422 of FIG. 4, to determine if the layer is platform-independent. In an embodiment, if file system build program 112 determines that the layer retrieved in step 612 is platform-independent ("yes" branch, decision block 614), then file system build program 112 proceeds to decision block 616 to determine if the layer has previously been built. In an embodiment, if file system build program 112 determines that the layer retrieved in step 612 is not platform-independent ("no" branch, decision block 614), then file system build program 112 proceeds to step 622 to build the image.

File system build program 112 determines if the layer is in the cache or the registry (decision block 616). In an embodiment, file system build program 112 determines whether the layer is already in the layer cache or registry. If the layer has previously been built by file system build program 112, then an image may already exist in the cache or registry. In an embodiment, if file system build program 112 determines that the layer is already in the layer cache or registry ("yes" branch, decision block 616), then file system build program 112 proceeds to step 618 to update the layer database. In an embodiment, if file system build program 112 determines that the layer is not already in the layer cache or registry ("no" branch, decision block 616), then file system build program 112 proceeds to step 628 to build the image of the layer.

File system build program 112 updates the LayerDB to point to the layer defined in the manifest (step 618). In an embodiment, if file system build program 112 determines that the layer is already in the layer cache or registry, then file system build program 112 updates the entry for this layer in the layer database (LayerDB) to point to the layer that was defined in the manifest for this file system build. In this way, file system build program 112 keeps the layer database current with the latest file system builds.

File system build program 112 determines if there are more layers remaining (decision block 620). In an embodiment, file system build program 112 determines if there are more layers remaining in the file system build. In an embodiment, if file system build program 112 determines that there are more layers remaining in the file system build ("yes" branch, decision block 620), then file system build program 112 returns to step 612 to retrieve the next layer. In an embodiment, if file system build program 112 determines that there are no more layers remaining in the file system build ("no" branch, decision block 620), then the file system build is complete, so file system build program 112 ends for this cycle.

File system build program 112 cross builds (step 622). In an embodiment, if file system build program 112 determines that the layer retrieved in step 612 is not platform-independent in decision block 614, then file system build program 112 cross builds the layer on the current platform for the target platform for the file system build.

File system build program 112 generates the layer and a hash of the layer (step 624). In an embodiment, file system build program 112 generates the layer and generates a hash of the layer, e.g., a sha256 hash.

File system build program 112 updates the manifest and the LayerDB (step 626). In an embodiment, file system build program 112 updates the layer database with the hash of the layer generated in step 624. File system build program 112 then proceeds to decision block 620 to determine if the build has more layers remaining.

File system build program 112 builds the layer (step 628). In an embodiment, if file system build program 112 determines that the layer is not already in the layer cache or registry in decision block 616, then file system build program 112 builds the layer. Since file system build program 112 already determined in decision block 614 that this layer is platform-independent, file system build program 112 can build this image directly and does not have to cross build the image as in step 622.

File system build program 112 updates the platform_chain_id (step 630). In an embodiment, file system build program 112 updates the platform_chain_id of the build to include the new layer built in step 628.

File system build program 112 updates the LayerDB (step 632). In an embodiment, file system build program 112 updates the layer database with the platform_chain_id of the layer generated in step 630. File system build program 112 then proceeds to decision block 620 to determine if the build has more layers remaining.

Figure 7:
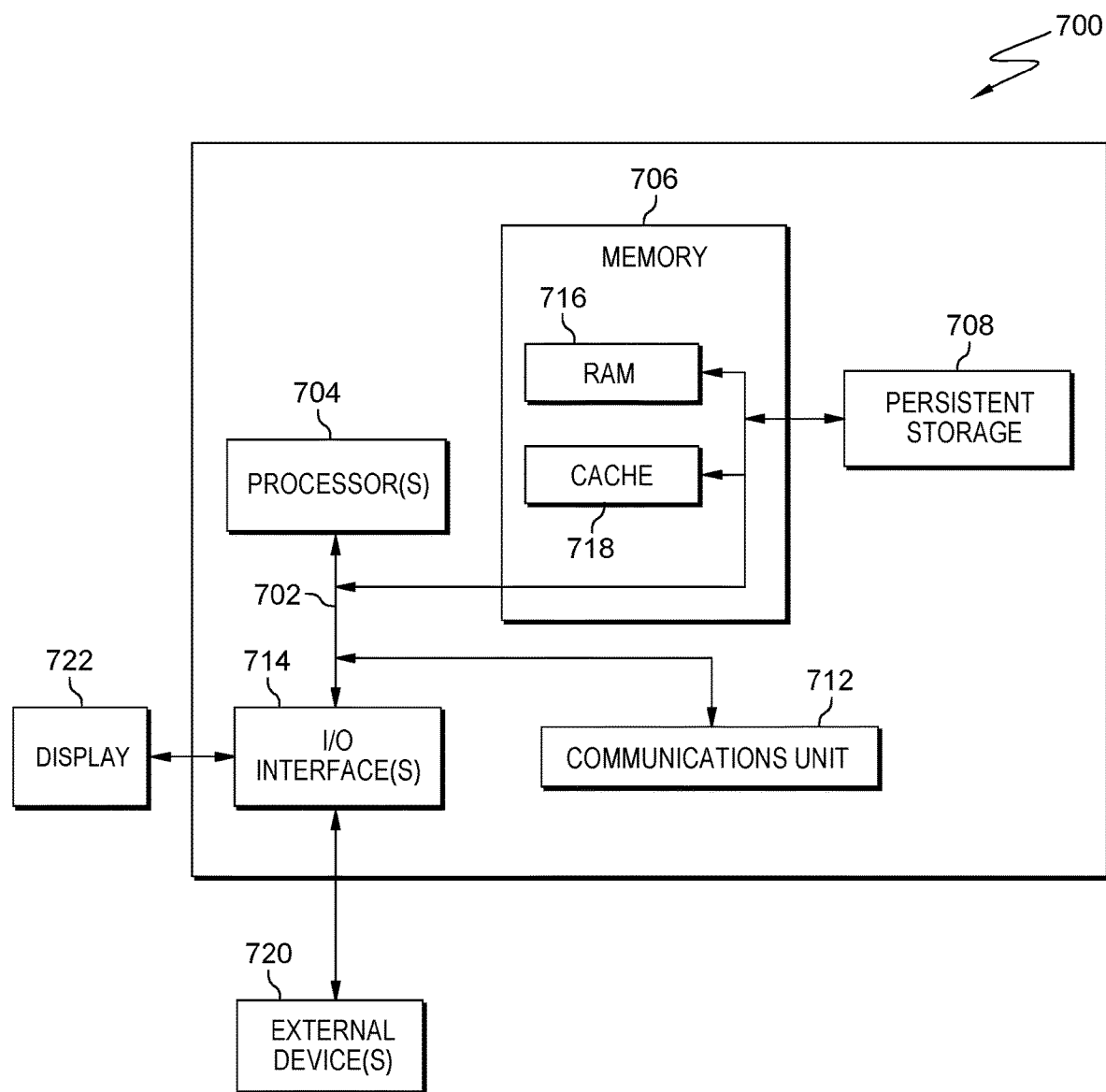
FIG. 7 depicts a block diagram of components of the computing devices executing the file system build program within the distributed data processing environment of FIG. 1, in accordance with an embodiment of the present invention.

FIG. 7 is a block diagram depicting components of computing device 110 suitable for file system build program 112, in accordance with at least one embodiment of the invention. FIG. 7 displays computer 700; one or more processor(s) 704 (including one or more computer processors); communications fabric 702; memory 706, including random-access memory (RAM) 716 and cache 718; persistent storage 708; communications unit 712; I/O interfaces 714; display 722; and external devices 720. It should be appreciated that FIG. 7 provides only an illustration of one embodiment and does not imply any limitations with regard to the environments in which different embodiments may be implemented. Many modifications to the depicted environment may be made.

As depicted, computer 700 operates over communications fabric 702, which provides communications between computer processor(s) 704, memory 706, persistent storage 708, communications unit 712, and I/O interface(s) 714. Communications fabric 702 may be implemented with any architecture suitable for passing data or control information between processors 704 (e.g., microprocessors, communications processors, and network processors), memory 706, external devices 720, and any other hardware components within a system. For example, communications fabric 702 may be implemented with one or more buses.

Memory 706 and persistent storage 708 are computer readable storage media. In the depicted embodiment, memory 706 comprises RAM 716 and cache 718. In general, memory 706 can include any suitable volatile or non-volatile computer readable storage media. Cache 718 is a fast memory that enhances the performance of processor(s) 704 by holding recently accessed data, and near recently accessed data, from RAM 716.

Program instructions for file system build program 112 may be stored in persistent storage 708, or more generally, any computer readable storage media, for execution by one or more of the respective computer processors 704 via one or more memories of memory 706. Persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. In the context of some embodiments of the present invention, the source of the various input data may be physically remote to computer 700 such that the input data may be received, and the output similarly transmitted via communications unit 712.

I/O interface(s) 714 allows for input and output of data with other devices that may be connected to computer 700. For example, I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., file system build program 112, can be stored on such portable computer readable storage media and can be loaded onto persistent storage 708 via I/O interface(s) 714. I/O interface(s) 714 also connect to display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to receiving a manifest for a file system build, retrieving, by one or more computer processors, a base layer for each platform of multiple central processor unit (CPU) architecture platforms to be built, wherein each base layer is an operating system base image for at least one of the multiple CPU architecture platforms;
responsive to determining that any layer of a plurality of layers to be built for the multiple CPU architecture platforms has not been built:
 a) retrieving, by the one or more computer processors, a next layer of the plurality of layers to be built;
 b) responsive to the next layer of the plurality of layers to be built is CPU architecture platform-independent, retrieving, by the one or more computer processors, the next layer from a cache, wherein the next layer supports each CPU architecture platform of the multiple CPU architecture platforms;
c) responsive to the next layer to be built is platform-dependent, building, by the one or more computer processors, the next layer, wherein a platform dependent copy of the next layer is built for the each CPU architecture platform of the multiple CPU architecture platforms;
iteratively repeating, by the one or more computer processors, above steps of a-c until each layer of the plurality of layers to be built are built; and
storing, by the one or more computer processors, a single image of a completed file system build, wherein the single image supports the each CPU architecture platform of the multiple CPU architecture platforms.

2. The computer-implemented method of claim 1, wherein the manifest to for the file system build includes a CPU architecture platform field for the each layer of the plurality of layers to be built, wherein the CPU architecture platform field indicates which CPU architecture platforms of the multiple CPU architecture platforms to be built are supported by the each layer of the plurality of layers to be built.

3. The computer-implemented method of claim 1, wherein a CPU architecture platform chain identification indicates whether the next layer is platform-independent.

4. The computer-implemented method of claim 3, wherein responsive to the next layer to be built is CPU architecture platform-dependent, building the next layer, wherein the copy of the next layer is built for the each CPU architecture platform of the multiple CPU architecture platforms comprises:
building, by the one or more computer processors, the copy of the next layer, wherein the copy of the next layer is cross built on a current CPU architecture platform for each CPU architecture platform of the multiple CPU architecture platforms;
generating, by the one or more computer processors, a hash of the copy of the next layer, wherein the hash of the copy of the next layer locates the copy of the next layer;
updating, by the one or more computer processors, the manifest to for the file system build with the hash of the copy of the next layer and the CPU architecture platform chain identification, wherein the CPU architecture platform chain identification associates the copy of the next layer with one or more parent layers; and
updating, by the one or more computer processors, a layer database with the copy of the next layer and the hash of the copy of the next layer.

5. The computer-implemented method of claim 3, wherein responsive to the next layer of the plurality of layers to be built is CPU architecture platform-independent, retrieving the next layer from the cache, wherein the next layer supports each CPU architecture platform of the multiple CPU architecture platforms further comprises:
searching, by the one or more computer processors, the cache for the next layer; and
responsive to the next layer to be built is found in the cache, updating, by the one or more computer processors, an entry for the next layer in a layer database to point to a layer in the manifest that was defined for the file system build.

6. The computer-implemented method of claim 5, wherein responsive to the next layer to be built is found in the cache, updating, by the one or more computer processors, the entry for the next layer in the layer database to point to the layer in the manifest that was defined for the file system build further comprises:
responsive to the next layer to be built is not found in the cache, building, by the one or more computer processors, the next layer;
updating, by the one or more computer processors, the CPU architecture platform chain identification, wherein the CPU architecture platform chain identification associates the next layer with one or more parent layers; and
updating, by the one or more computer processors, the layer database with the next layer.

7. The computer-implemented method of claim 1, wherein responsive to receiving the manifest to for the file system build, retrieving the base layer for each CPU architecture platform of the multiple CPU architecture platforms to be built, wherein the base layer is the operating system base image further comprises:
determining, by the one or more computer processors, whether the base layer is defined in the manifest for each CPU architecture platform of the multiple CPU architecture platforms to be built; and
responsive to determining that the base layer is not defined in the manifest for any CPU architecture platform of the multiple CPU architecture platforms to be built, searching, by the one or more computer processors, for the base layer for any CPU architecture platform of the multiple CPU architecture platforms to be built in one or more remote registries.

8. A computer program product comprising one or more computer readable storage medium and program instructions stored on the one or more computer readable storage media, the program instructions including instructions to:
responsive to receiving a manifest for a file system build, retrieve a base layer for each platform of multiple central processor unit (CPU) architecture platforms to be built, wherein the base layer is an operating system base image for at least one of the multiple CPU architecture platforms;
responsive to determining that any layer of a plurality of layers to be built for the multiple CPU architecture platforms has not been built:
a) retrieve a next layer of the plurality of layers to be built;
b) responsive to the next layer of the plurality of layers to be built is CPU architecture platform-independent, retrieve the next layer from a cache, wherein the next layer supports each CPU architecture platform of the multiple CPU architecture platforms;
c) responsive to the next layer to be built is CPU architecture platform-dependent, build the next layer, wherein a copy of the next layer is built for the each CPU architecture platform of the multiple CPU architecture platforms;
iteratively repeating above steps of a-c until each layer of the plurality of layers to be built are built; and
store a single image of a completed file system build, wherein the single image supports the each CPU architecture platform of the multiple CPU architecture platforms.

9. The computer program product of claim 8, wherein the manifest to for the file system build includes a CPU architecture platform field for the each layer of the plurality of layers to be built, wherein the CPU architecture platform field indicates which CPU architecture platforms of the multiple CPU architecture platforms to be built are supported by the each layer of the plurality of layers to be built.

10. The computer program product of claim 8, wherein a CPU architecture platform chain identification indicates whether the next layer is CPU architecture platform-independent.

11. The computer program product of claim 10, wherein responsive to the next layer to be built is CPU architecture platform-dependent, build the next layer, wherein the copy of the next layer is built for the each CPU architecture platform of the multiple CPU architecture platforms comprises one or more of the following program instructions, stored on the one or more computer readable storage media, to:
   build the copy of the next layer, wherein the copy of the next layer is cross built on a current CPU architecture platform for each platform of the multiple CPU architecture platforms;
   generate a hash of the copy of the next layer, wherein the hash of the copy of the next layer locates the copy of the next layer;
   update the manifest for the file system build with the hash of the copy of the next layer and the CPU architecture platform chain identification, wherein the CPU architecture platform chain identification associates the copy of the next layer with one or more parent layers; and
   update a layer database with the copy of the next layer and the hash of the copy of the next layer.

12. The computer program product of claim 10, wherein responsive to the next layer of the plurality of layers to be built is CPU architecture platform-independent, retrieve the next layer from the cache, wherein the next layer supports each CPU architecture platform of the multiple CPU architecture platforms further comprises one or more of the following program instructions, stored on the one or more computer readable storage media, to:
   search the cache for the next layer; and
   responsive to the next layer to be built is found in the cache, update an entry for the next layer in a layer database to point to a layer in the manifest that was defined for the file system build.

13. The computer program product of claim 12, wherein responsive to the next layer to be built is found in the cache, update an entry for the next layer in the layer database to point to the layer in the manifest that was defined for the file system build further comprises one or more of the following program instructions, stored on the one or more computer readable storage media, to:
   responsive to the next layer to be built is not found in the cache, build the next layer;
   update the CPU architecture platform chain identification, wherein the CPU architecture platform chain identification associates the next layer with one or more parent layers; and
   update the layer database with the next layer.

14. The computer program product of claim 8, wherein responsive to receiving the manifest for the file system build, retrieve the base layer for each CPU architecture platform of the multiple CPU architecture platforms to be built, wherein the base layer is the operating system base image further comprises one or more of the following program instructions, stored on the one or more computer readable storage media, to:
   determine whether the base layer is defined in the manifest for each CPU architecture platform of the multiple CPU architecture platforms to be built; and
   responsive to determining that the base layer is not defined in the manifest for any CPU architecture platform of the multiple CPU architecture platforms to be built, search for the base layer for any CPU architecture platform of the multiple CPU architecture platforms to be built in one or more remote registries.

15. A computer system comprising:

one or more computer processors;

one or more computer readable storage media; and program instructions stored on the one or more computer readable storage media for execution by at least one of the one or more computer processors, the stored program instructions including instructions to:

responsive to receiving a manifest for a file system build, retrieve a base layer for each platform of multiple central processor unit (CPU) architecture platforms to be built, wherein the base layer is an operating system base image for at least one of the multiple CPU architecture platforms;

responsive to determining that any layer of a plurality of layers to be built for the multiple CPU architecture platforms has not been built:
   a) retrieve a next layer of the plurality of layers to be built;
   b) responsive to the next layer of the plurality of layers to be built is CPU architecture platform-independent, retrieve the next layer from a cache, wherein the next layer supports each CPU architecture platform of the multiple CPU architecture platforms;
   c) responsive to the next layer to be built is CPU architecture platform-dependent, build the next layer, wherein a copy of the next layer is built for the each CPU architecture platform of the multiple CPU architecture platforms;

iteratively repeating above steps of a-c until each layer of the plurality of layers to be built are built; and store a single image of a completed file system build, wherein the single image supports the each CPU architecture platform of the multiple CPU architecture platforms.

16. The computer system of claim 15, wherein a CPU architecture platform chain identification indicates whether the next layer is CPU architecture platform-independent.

17. The computer system of claim 16, wherein responsive to the next layer to be built is CPU architecture platform-dependent, build the next layer, wherein the copy of the next layer is built for the each CPU architecture platform of the multiple CPU architecture platforms comprises one or more of the following program instructions, stored on the one or more computer readable storage media, to:
   build the copy of the next layer, wherein the copy of the next layer is cross built on a current CPU architecture platform for each platform of the multiple CPU architecture platforms;
   generate a hash of the copy of the next layer, wherein the hash of the copy of the next layer locates the copy of the next layer;
   update the manifest for the file system build with the hash of the copy of the next layer and the CPU architecture platform chain identification, wherein the CPU architecture platform chain identification associates the copy of the next layer with one or more parent layers; and
   update a layer database with the copy of the next layer and the hash of the copy of the next layer.

18. The computer system of claim 16, wherein responsive to the next layer of the plurality of layers to be built is CPU architecture platform-independent, retrieve the next layer from the cache, wherein the next layer supports each platform of the multiple CPU architecture platforms further comprises one or more of the following program instructions, stored on the one or more computer readable storage media, to:
   search the cache for the next layer; and
   responsive to the next layer to be built is found in the cache, update an entry for the next layer in a layer database to point to a layer in the manifest that was defined for the file system build.

19. The computer system of claim 18, wherein responsive to the next layer to be built is found in the cache, update an entry for the next layer in the layer database to point to the layer in the manifest that was defined for the file system build further comprises one or more of the following program instructions, stored on the one or more computer readable storage media, to:
   responsive to the next layer to be built is not found in the cache, build the next layer;
   update the CPU architecture platform chain identification, wherein the CPU architecture platform chain identification associates the next layer with one or more parent layers; and
   update the layer database with the next layer.

20. The computer system of claim 15, wherein responsive to receiving the manifest for the file system build, retrieve the base layer for each platform of the multiple CPU architecture platforms to be built, wherein the base layer is the operating system base image further comprises one or more of the following program instructions, stored on the one or more computer readable storage media, to:
   determine whether the base layer is defined in the manifest for each CPU architecture platform of the multiple CPU architecture platforms to be built; and
   responsive to determining that the base layer is not defined in the manifest for any CPU architecture platform of the multiple CPU architecture platforms to be built, search for the base layer for any CPU architecture platform of the multiple CPU architecture platforms to be built in one or more remote registries.

* * * * *